United States Patent Office 3,396,672
Patented Aug. 13, 1968

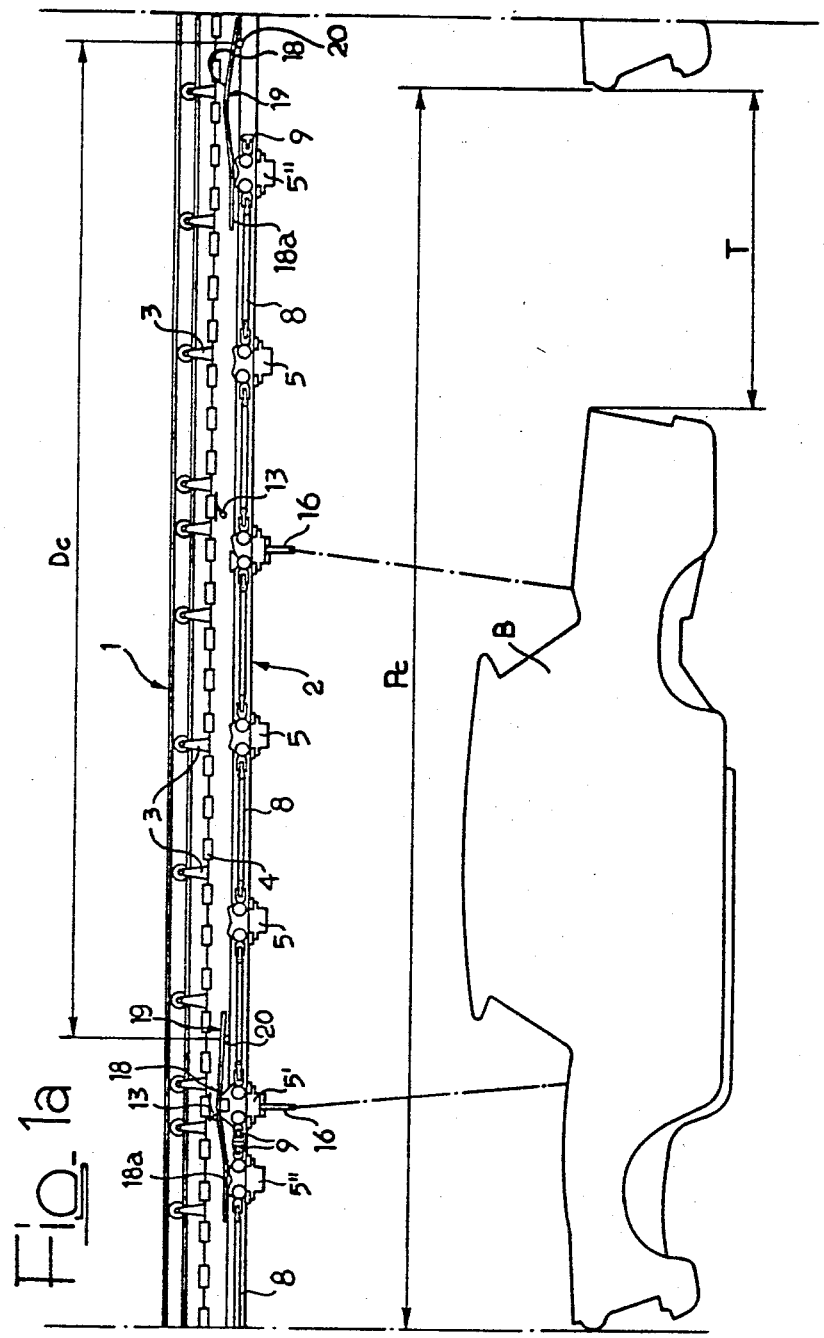

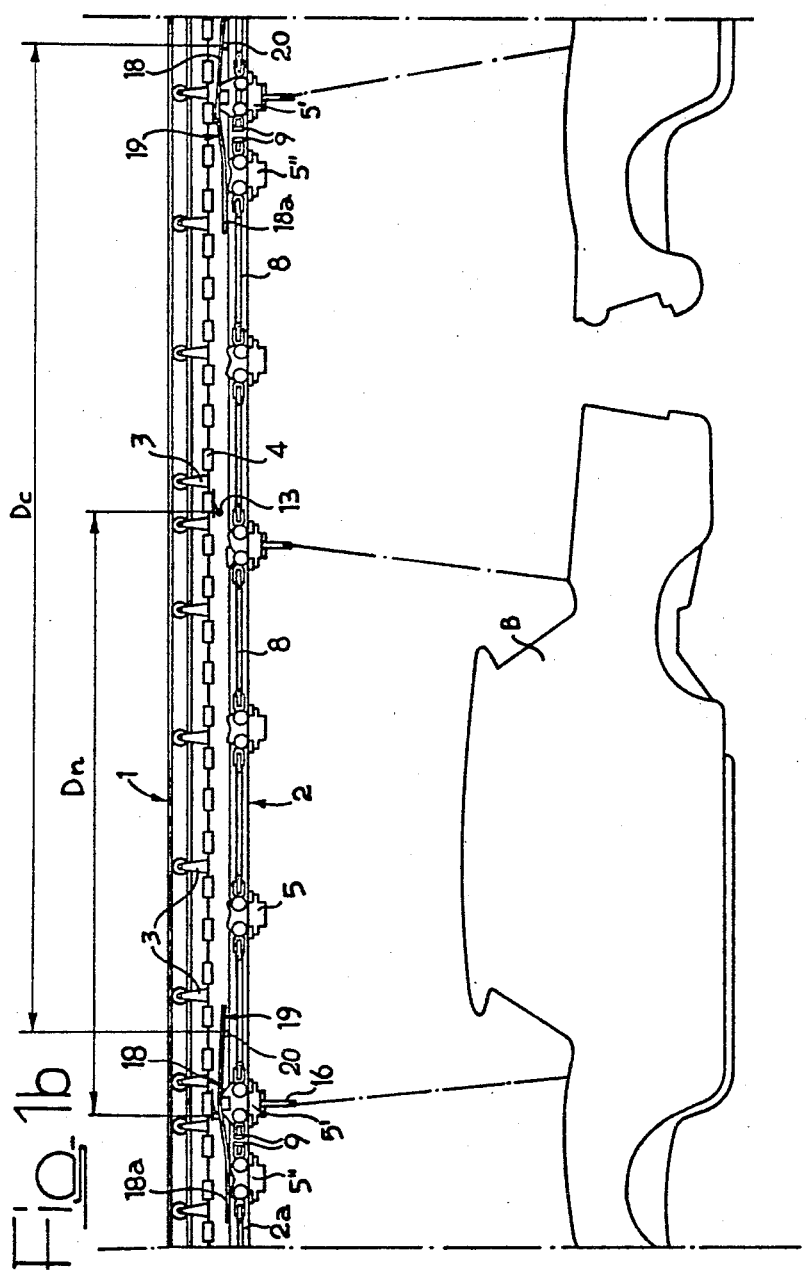

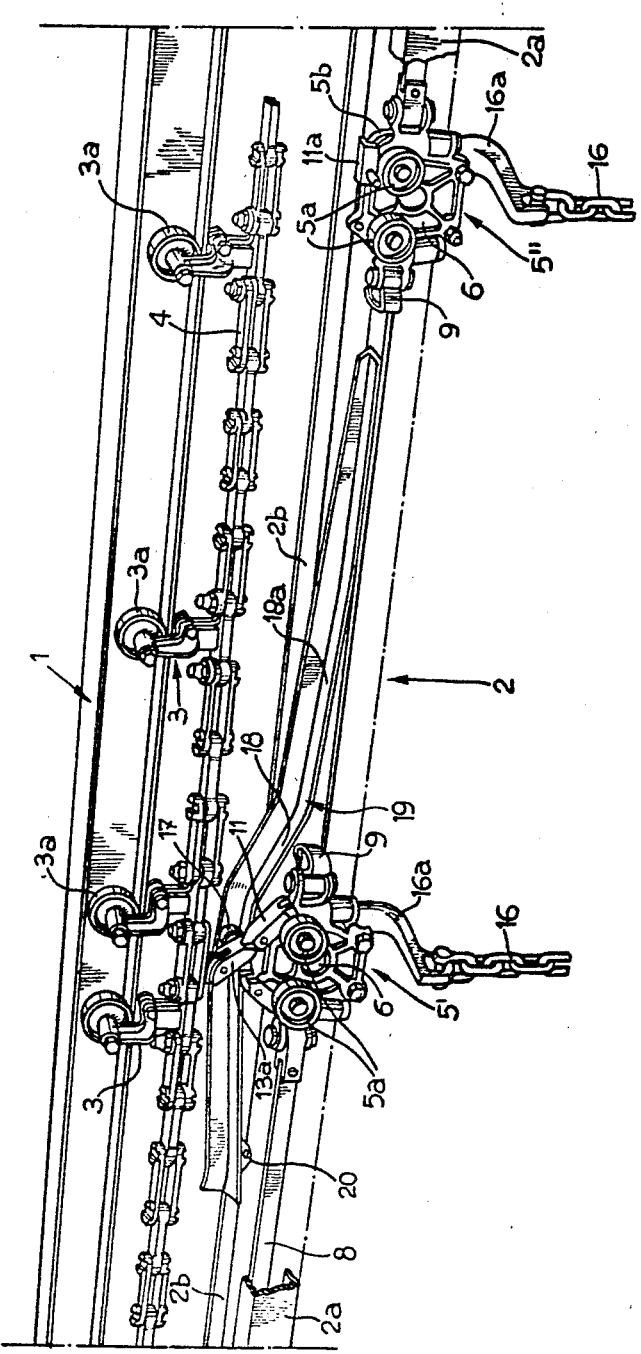

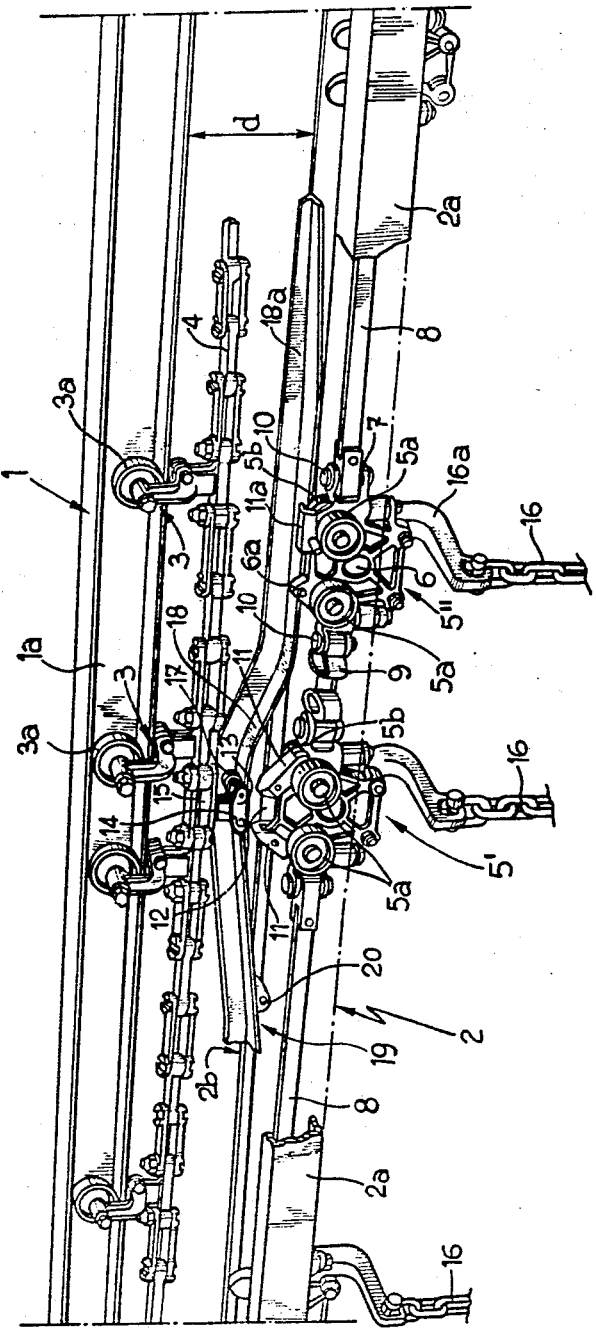

3,396,672
OVERHEAD CONVEYOR
Pier Carlo Zerbi, Turin, Italy, assignor to Fiat Societa per Azioni, Turin, Italy
Filed Feb. 15, 1966, Ser. No. 527,572
Claims priority, application Italy, Feb. 16, 1965, 3,815/65
3 Claims. (Cl. 104—172)

ABSTRACT OF THE DISCLOSURE

A conveyor comprising sets of interconnected spaced carriers movable along a bottom track, the leading carrier of each set engageable by one of a number of pawls depending from a pull chain guided by a top rail. At least one station along the conveyor track comprising a plurality of cams and having externally controlled means for moving the leading cam of the station to its operative position in which it raises the pawl and disengages it from the leading carrier, the other cams of each station being brought to their operative positions by the trailing carriers of each set.

This invention relates to overhead conveyors for transferring suspended loads along manufacturing lines, of double rail type including a top rail for guiding supporting carriers for a pull chain and a bottom rail for guiding further carriers supporting the suspended load.

More particularly, this invention concerns a device for connecting the pull chain to the load supporting carriers for transferring said carriers from one station to the next one, the carriers being uncoupled from the chain at the stations.

An object of this invention is to provide a conveyor capable of preventing mutual bumping of carriers when the latter reach the station, in order to avoid oscillations of the suspended loads.

A further object of this invention is to provide a conveyor having a coupling device for the carriers which affords automatically a constant spacing of the loads as they leave stations as well as a quick adjustment of the spacing of the suspended loads to suit the load size.

A further object of this invention is to provide a conveyor having a coupling device capable of durably maintaining the pull chain and supporting carriers interengaged even when it becomes necessary to draw the two rails nearer together.

Further objects of this invention are the provision of a conveyor of the type mentioned above which is simple in construction and reliable in operation.

With the above objects in view this invention provides double-rail overhead conveyor for transporting evenly spaced loads comprising a top rail for guiding a pull chain provided with depending pawls and a bottom rail for sets of load supporting carriers interconnected by spacers, each set comprising a leading carrier and a trailing carrier, the leading carrier in each set being formed with a seating engageable by any one of said pawls, said pawls being movable between an engaged and a disengaged position, with respect to the seating in the leading carrier, wherein a plurality of elongated cams spaced along the bottom rail is situated in the path of the carriers, said cams being normally inoperative so as not to interfere with the pawls and being moved by the carriers into an operative position in the path of the pawls, the distance between the cams exceeding the length of any of the sets of carriers by a length which is less than the length of a cam.

Further characteristic features and advantages will be understood from the appended detailed description referring to the accompanying drawings given by way of a non-limiting example, wherein:

FIGURES 1a and 1b are a diagrammatical front view of a section of the conveyor according to this invention comprising a station;

FIGURE 2 is a perspective view on an enlarged scale showing in detail the leading carrier of a set at its operative coupling step and FIGURE 3 is a perspective view similar to FIGURE 2 showing the said leading carrier at its operative uncoupling step.

On the drawings 1 and 2 generally denote the top and bottom rail of the conveyor for guiding the stirrup-shaped carriers 3 supporting a pull chain 4, and for guiding further carriers 5 supporting the load to be transferred, respectively, which in the embodiment shown is in the form of motor car bodies A–B–C.

The top rail 1 is advantageously in the form of an I-shaped structural member 1a having its web extending vertically, and the bottom flanges of which act as rolling tracks for a pair of rollers 3a, the rollers 3a being carried by the stirrup arms on opposite sides of the web of the structural member.

The bottom track 2 is in the form of a first C-shaped structural member 2a and a second angular structural member 2b which are juxtaposed and have webs extending vertically in order to define by their horizontal flanges rolling tracks for pairs of rollers 5a, 5b of carriers 5.

The carriers each comprise a body 6 conveniently stiffened by radial ribs, having end eyelets 7 for engaging connecting bars 8 and end bumper 9 articulated to the body 6 by means of pivots 10, the body 6 moreover comprising a depending arm 16a carrying at its free end a chain 16 for suspending the load.

A chosen number of carriers connected by means of bars 8 forms a set each presenting a leading carrier 5′ and a trailing carrier 5″.

At the top of the body 6, each carrier is provided with extensions 6a having articulated thereto flaps 11 in an inverted V arrangement in order to define a seating 12 adapted to receive the end of a driving pawl 13 articulated by means of a pivot 14 to a suitable link 15 on the pull chain 4. The pawl 13 is movable to an operative position 13a for engagement in the seating 12 in the carrier 5.

In order to effect this movement, the pawl is provided with an end roller 17 adapted to roll over a curved portion 18 of an elongated cam 19 presenting a straight tail portion 18a.

The cam 19 is hingedly supported by means of a pivot 20 from the web of the angular structural member 2b so that in its inoperative position (FIG. 2) the straight portion 18a of the cam bears on the track formed by the member 2b, and the rollers 17 pass over the curved portion 18, without uncoupling the carrier from the chain 4. When rollers 5b of a trailing carrier 5″ of one set pass under the straight portion 18a of the cam, the latter swings upwardly about the pivot 20 into its operative position (FIG. 3) in which the curved portion 18 lifts the roller 17 and tilts the pawl 13 about its pivot 14, to uncouple a leading carrier 5′ of the following set from the chain 4.

The above described carriers 5 are interconnected by rigid bars 8 to form sets including a number of carriers variable in accordance with the maximum longitudinal dimension of the transferred loads. In the embodiment shown each conveying set includes six carriers, so that the distance between the end bumpers 9 of a set exceeds the length of the car bodies A–B–C, which as shown on the drawing, are suspended from the first and the fourth carrier of each set.

The first or leading carrier of each set, denoted by 5′ in FIGURE 1 has its flaps 11 arranged in their operative position to form a seating 12. The leading and trailing carriers only of the set are provided with end bumpers 9.

According to this invention a plurality of rectilinear cams 19 is distributed along the bottom track 2, the pitch Dc of said cams exceeding the length of each set of carriers by a length which is less than the length of the cam 19, whereby when the trailing carrier 5″ of a stationary set maintains a cam lifter, the pawl 13 engaged in the leading carrier 5′ of a next coming set will be tilted by the curved portion 18 of said cam to uncouple said leading carrier 5′ right before the two carriers 5′, 5″ strike against each other.

The driving pawls 13 are spaced along the pull chain 4 by a suitable pitch Dn which is a fraction of the pitch Pc defined by the length of the load and the spacing T between the loads moving between the stations.

Each station comprises a leading cam 19′ which is moved to its operative position for stoppage of a next coming set of carriers by the action of externally controlled means (not shown), advantageously of a pneumatic or hydraulic type.

In operation, at each station a conveying set is arrested by uncoupling of the pawl 13 by the cam 19′ actuated by the abovementioned external means.

As a result of the abovementioned relation between the pitch Dc of the cams and length of the conveying set, the wheels 5b of the trailing carrier 5″ of the set arrested at a station will stop under the straight portion 18b of the proceding cam 19 and tilt the latter to its operative position so that the curved portion 18 of said preceding cam engages the roller 17 of the driving pawl 13 of the next following conveying set and releases it from the seating 12 in the leading carrier, thereby stopping the conveying set before the latter may strike against the previously arrested set.

The transfer motion is resumed when the leading cam 19′ is released in its inoperative lowered position; by effect of the relation between the load pitch Pc and spacing Dn of the pawls 13 the suspended loads take their transfer spacing T.

An essential feature is the interengagement of the pawl 13 and its respective seating 12 by the lowering of the pawl by virtue of its own weight, which ensures engagement even on decrease of the spacing $d$ of the two tracks as a result of variations in height on the path. Moreover, the peculiar structure of the coupling device as described permits switching between various transfer tracks though they may be different in load pitch and rate of speed of the conveying chains, inasmuch as on lifting the pawl 13 on a given chain will allow to receive sets of carriers from another conveyor.

Of course, the principle of the invention being left unaltered, embodiments and constructional details may be widely varied with respect to the non-limiting example described and shown without departing from the scope of this invention as defined in the appended claims.

What I claim is:

1. A double-rail overhead conveyor for transporting evenly spaced loads comprising a top rail for guiding a pull chain provided with depending pawls and a bottom track for sets of load supporting carriers interconnected by spacers, each set comprising a leading carrier and a trailing carrier, the leading carrier in each set being formed with a seating engageable by any one of said pawls, said pawls being movable between an engaged and a disengaged positon with respect to the seating in the leading carrier, said bottom track having at least one station therealong comprising a plurality of elongated cams spaced along the bottom rail situated in the path of the carriers, said cams being normally inoperative so as not to interfere with the pawls and being moved by the carriers into an operative position in the path of the pawls, the distance between the cams exceeding the length of any of the sets of carriers by a length which is less than the length of a cam, and each station further comprising a leading cam which is moved by externally controlled means to its operative position in order to uncouple the leading carrier of a set from the pull chain.

2. Conveyor as claimd in claim 1, wherein the driving pawls are spaced by a pitch being a fraction of the load pitch defined by the length of the load and spacing between loads moving between stations.

3. Conveyor as claimed in claim 1, wherein the cams are each articulated to the web of a structural member forming the bottom rail of the conveyor and are arranged above the horizontal flange of the said member in the path of the load supporting carriers.

References Cited

UNITED STATES PATENTS 2,987,012   6/1961   King _____ 104—172
3,195,473   7/1965   Dehne _____ 104—172

ARTHUR L. LA POINT, *Primary Examiner.*

D. F. WORTH, *Assistant Examiner.*